United States Patent [19]

Wilson

[11] 4,331,029

[45] May 25, 1982

[54] METHOD AND APPARATUS FOR MEASUREMENT OF ENGINE IGNITION TIMING

[75] Inventor: Scott E. Wilson, Ann Arbor, Mich.

[73] Assignee: Jodon Engineering Associates, Inc., Ann Arbor, Mich.

[21] Appl. No.: 166,767

[22] Filed: Jul. 8, 1980

[51] Int. Cl.[3] .......... G01M 15/00

[52] U.S. Cl. .......... 73/117.3; 324/391; 333/260

[58] Field of Search .......... 73/116, 117.3, 35; 324/391, 392; 333/260, 245; 123/414, 416, 417

[56] References Cited

U.S. PATENT DOCUMENTS 3,155,930 11/1964 Lovejoy .......... 333/260
3,589,177 6/1971 Merlo .......... 73/116
3,703,825 11/1972 Merlo .......... 73/116

OTHER PUBLICATIONS

Lienesch, J. H. et al., Using Microwaves . . . Position, SAE Paper No. 790103, Feb. 1979.

*Primary Examiner*—Jerry W. Myracle
*Attorney, Agent, or Firm*—Barnes, Kisselle, Raisch & Choate

[57] ABSTRACT

Method and apparatus for measuring ignition timing of an internal combustion engine wherein angular position of the engine crankshaft is monitored while microwave radiation is injected into a selected engine cylinder. An angular position of the engine crankshaft at an apparent top dead center position of the piston in the selected cylinder is identified as a function of microwave resonances within the cylinder. The angle of piston top dead center position is then compared with an event correlated with ignition at the selected cylinder to determine the ignition angle relative to the piston top dead center position. Ignition timing may then be adjusted to obtain a desired angular relationship between ignition and piston top dead center.

19 Claims, 8 Drawing Figures

METHOD AND APPARATUS FOR MEASUREMENT OF ENGINE IGNITION TIMING

The present invention relates to measuring and testing, and more particularly to methods and apparatus for measurement and adjustment of ignition timing in an internal combustion engine.

Monitoring and diagnosis of events within the combustion chamber of an internal combustion engine, including specifically identification of piston top dead center (TDC) position and accurate measurement of crank angle at ignition with respect to TDC, are assuming increasing and even critical importance with increased emphasis on fuel economy and emissions control. The patents to Merlo U.S. Pat. Nos. 3,589,177 and 3,703,825 disclose a technique for monitoring events within the combustion chamber of a gasoline engine by coupling a source of microwave energy to an engine spark plug and detecting resonance events during engine operation. Merlo U.S. Pat. No. 3,589,177 discloses that information regarding crank angle at ignition may be obtained by measuring elapsed time between ignition and resonance events associated with piston bottom dead center (BDC) position. Merlo U.S. Pat. No. 3,703,825 teaches that BDC may be located with accuracy by varying the frequency of microwave emissions radiated by the spark plug until the resonances bracketing BDC merge and begin to overlap.

Lienesch et al, "Using Microwave to Phase Cylinder Pressure to Crankshaft Position," SAE Paper No. 790103, February 1979, describes a technique for locating TDC in a motored gasoline engine by replacing the spark plug in a selected cylinder with a microwave probe. The resonance signals on either side of piston TDC are displayed on an oscilloscope, together with a 360 pulse per revolution signal from a toothed flywheel. The crank angle between resonance peaks is measured and crankshaft angular position at actual piston TDC is then calculated mathematically. Application of this technique to measurement of ignition timing has involved several minutes of computer calculations, and thus is unsuitable for real time measurement and adjustment of ignition timing events on a mass production basis.

A general object of the present invention is to provide a method and apparatus for measuring ignition timing events in an internal combustion engine which is fast, accurate and readily adaptable for use in real time adjustment of ignition timing events. More specifically, an object of the present invention is to provide a method and apparatus of the type described which operates in a matter of seconds, as distinguished from minutes or hours, and has a resolution on the order of tenths of a degree of crank angle.

A further object of the invention is to provide a method and apparatus for monitoring engine timing events which is essentially time independent, and therefore is not accuracy-limited by an ability to maintain constant engine RPM.

A further object of the invention is to provide a method and apparatus for monitoring ignition timing events in an internal combustion engine, including specifically the location of piston TDC, which may be used in either a gasoline or a diesel engine.

The invention, together with additional objects, features and advantages thereof, will be best understood from the following description, the appended claims and the accompanying drawings in which:

Figure 1:
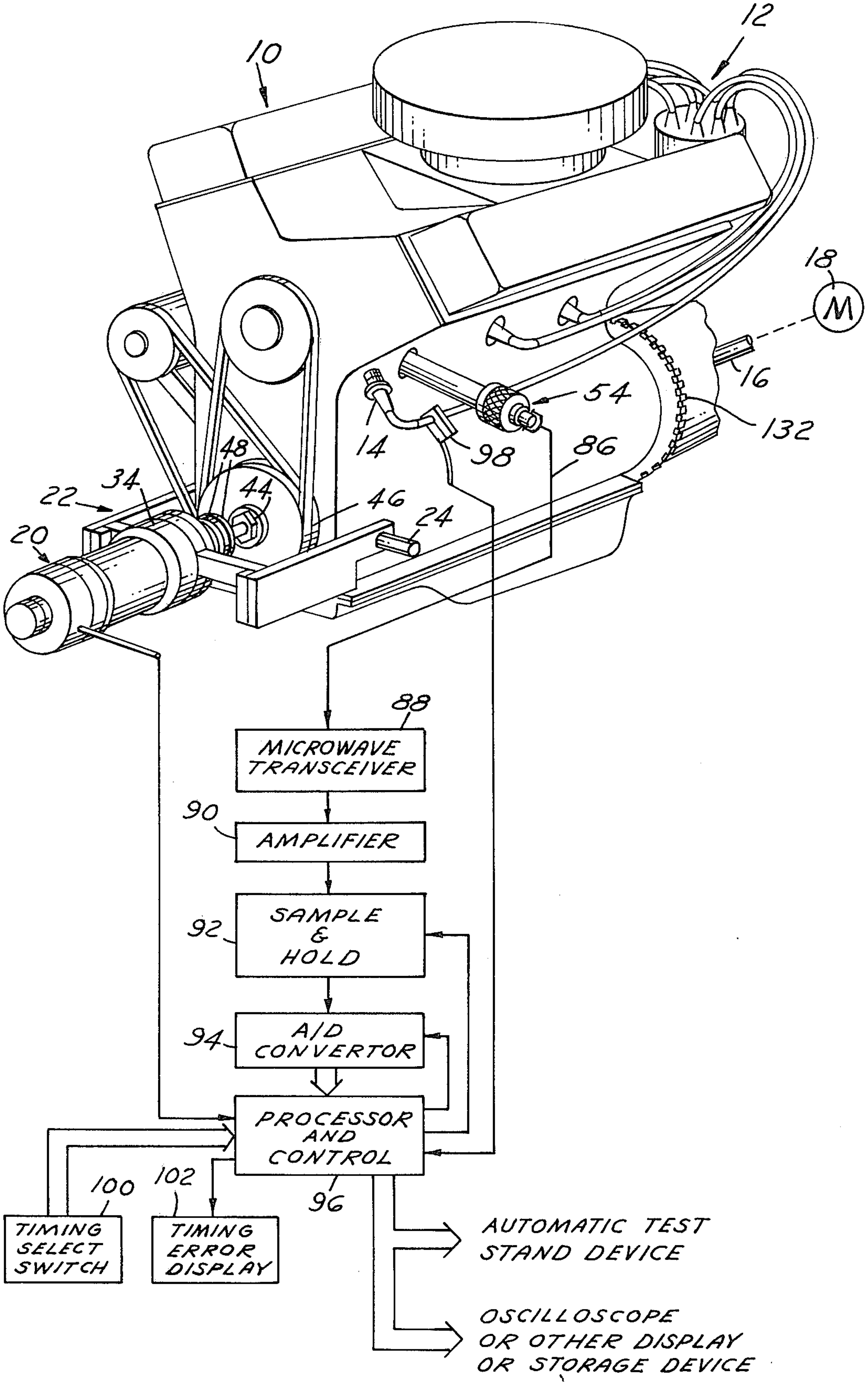
FIG. 1 is a functional block diagram of a presently preferred embodiment of the apparatus in accordance with the invention coupled to an internal combustion gasoline engine.

FIG. 1 illustrates a conventional V-6 gasoline or spark-type internal combustion engine 10 including a distributor 12 coupled to a plurality of engine spark plugs 14. For testing ignition timing in accordance with one aspect of the invention, engine 10 is mounted on a "cold test stand" and has its output or crankshaft 16 coupled to a motor 18 so that the engine may be cycled without actual fuel ignition.

Figure 2:
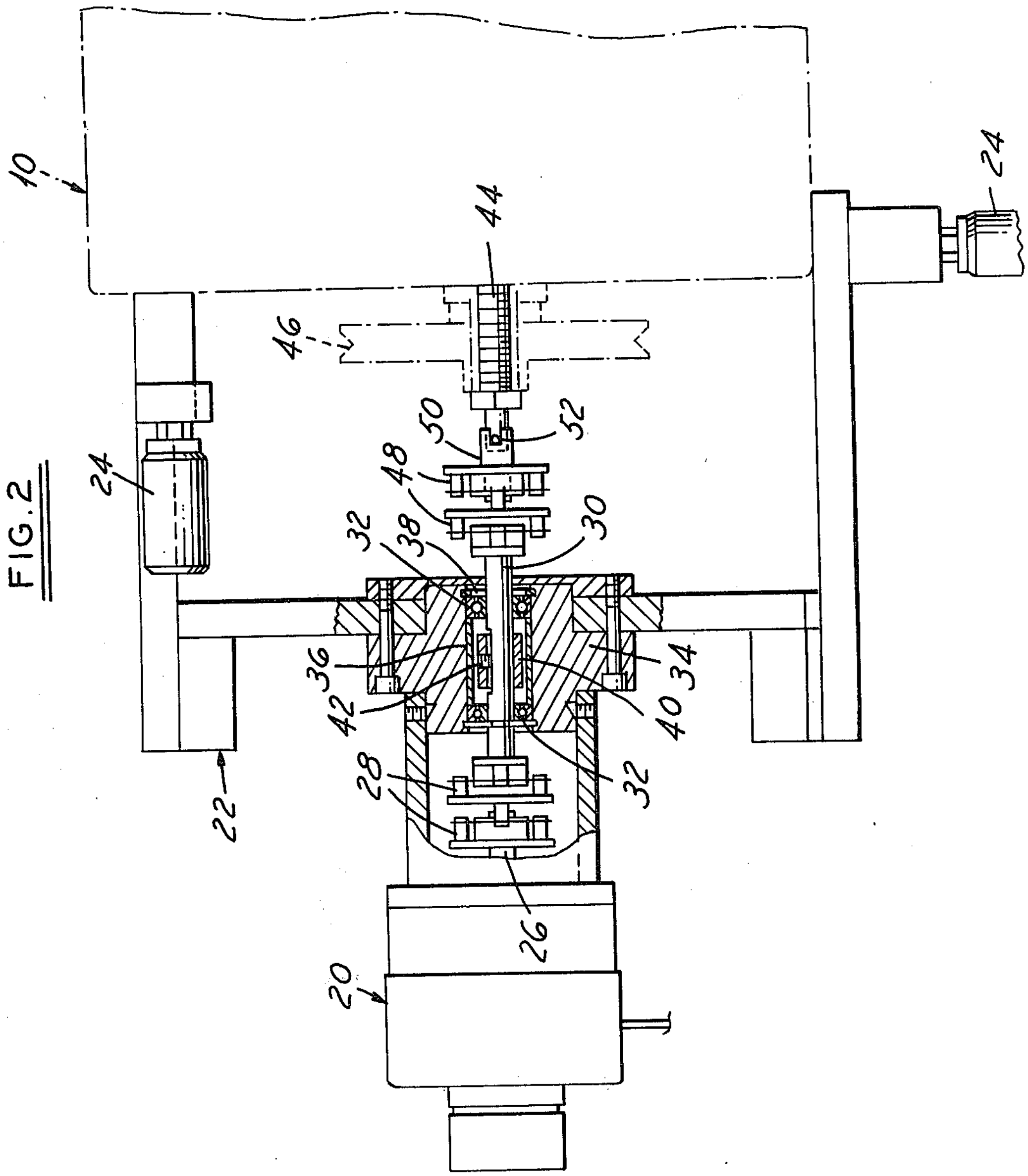
FIG. 2 is a top plan partially sectioned view on an enlarged scale of the encoder illustrated in FIG. 1 coupled to the engine output shaft.

Referring to FIGS. 1 and 2, an optical shaft encoder 20 is mounted to the engine block and rotatably coupled to the engine crankshaft. More particularly, encoder 20 is rigidly carried by a mounting bracket arrangement 22 having knurled screws or the like 24 located and adapted to be threaded into engine mounting openings on the engine block. Bracket 22 and the locations of screws 24 thereon vary with engine model. The encoder input shaft 26 (FIG. 2) is mounted by a flexible coupler 28 to a bearing shaft 30 which is rotatably mounted within bracket 22 by the bearings 32. Bearings 32 are carried within an axial bore in the bracket collar 34 and are axially separated from each other by the bearing spacer sleeve 36. A pair of snap rings 38 retain bearings 32 within collar 34. A shaft retainer 40 is mounted on shaft 30 between bearings 32 and is held thereon by the set screw 42. A coupler bolt 44 is threaded into the opening for the bolt (not shown) which normally holds the pulley 46 on the engine crankshaft. A flexible coupling 48 couples bearing shaft 30 to bolt 44 by means of the shaft adapter 50 telescopically received over an end of bolt 44 and rotatably coupled thereto by the pin 52. In one working embodiment of the invention, encoder 20 comprises a model 39-31-B-13-900-CC encoder marketed by Dynamics Research Corporation.

Figure 3:
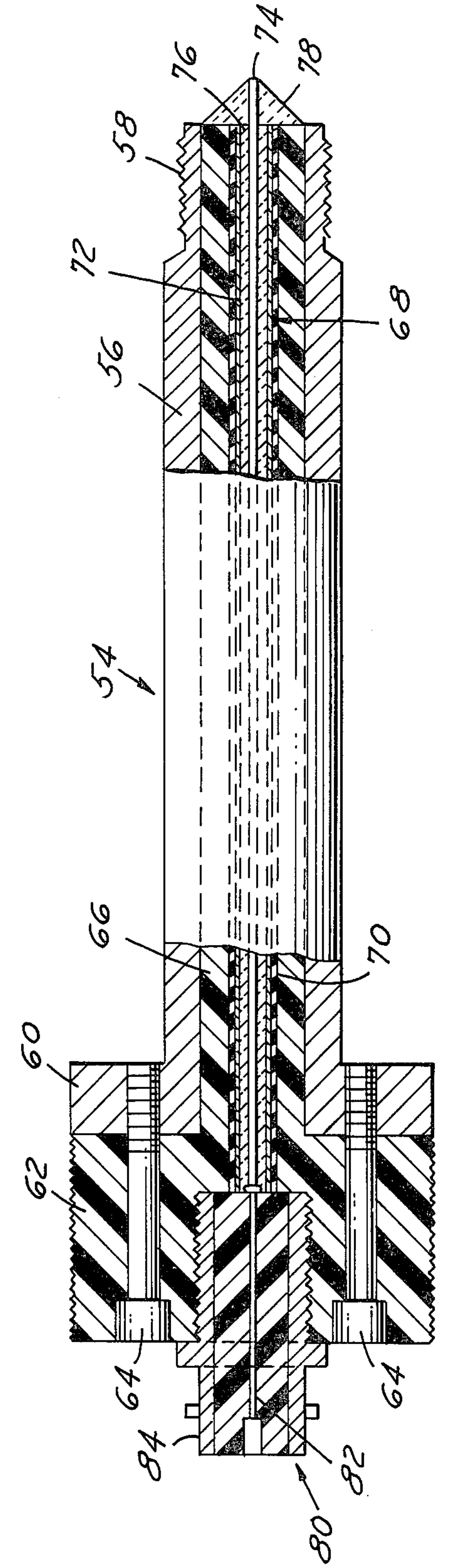
FIG. 3 is an elevational partially sectioned view on an enlarged scale of a microwave probe in accordance with the invention and illustrated in FIG. 1.

Returning to FIG. 1, one of the spark plugs 14 is removed from the engine block and a microwave probe 54 in accordance with the invention is threaded into the spark plug opening. Referring to FIG. 3, probe 54 comprises an outer metal sleeve 56 threaded at one end 58 so as to be received into the spark plug opening and having a flange 60 radiating from the opposing or second sleeve end. A block 62 of insulating material such as plastic is mounted on flange 60 by the screws 64 and has an integral sleeve 66 telescopically received in and extending through outer sleeve 56. A length of coax cable 68 is snugly received within the central bore of sleeve 66. Coax cable 68 includes an outer insulation sheath 70 surrounding an outer conductor 72 of braided wire, for example. A central conductor 74 extends through cable 68 and is separated from outer conductor 72 by the insulation layer 76. Insulation 70, 76 and outer conductor 72 terminate flush with the end 58 of outer sleeve 56, as does insulator sleeve 66, while the coax central conductor 74 protrudes therefrom. The end of probe 54 to be inserted into the spark plug opening is sealed by a layer 78 of epoxy. A coax BNC-type connector 80 is received in a threaded opening in block 62. Connector 80 has a central conductor 82 connected to coax central conductor 74 and a housing 84 connected to coax outer conductor 72 in the usual manner.

Returning to FIG. 1, probe 54 is coupled by a length of coax cable 86 to a microwave transceiver 88. In the working embodiment of the invention described herein, transceiver 88 comprises a Microwave Associates "Gunplexer" model MA-87141-1 and a Hewlett Packard coax adapter model X281A. Transceiver 88 is connected through an amplifier 90 to a sample and hold circuit 92. Sample and hold circuit 92 is connected through an A/D convertor 94 to a central processor and control unit 96 which controls the operation of sample and hold circuit 92 and A/D converter 94. Processor and control unit 96 also receives inputs from shaft encoder 20 and from an inductive pickup 98 operatively coupled to the spark plug cable attached to the particular spark plug 14 removed from the opening in the engine block into which probe 54 is received. Suitable inductive pickups 98 are marketed by the Sun Electric Company.

Process and control unit 96 also receives an input from timing select switch 100, which may comprise thumbwheel switches or the like manually set by an operator so as to identify a desired angular relationship between a spark signal to plug 14 and piston TDC. For example, if it is desired that the spark signal to plug 14 lead piston TDC by 9.0°, switches 100 are adjusted to a corresponding setting. Process and control unit 96 has an output coupled to a timing error display 102. In a preferred embodiment of the invention, display 102 comprises a series of lights indexed in graduations of 0.2° around a center position which corresponds to the angle selected by switch 100. Thus, as will be described in greater detail hereinafter, an operator may adjust distributor 12 in the usual manner while observing display 102 until the display lamps indicate that the measured ignition timing angle corresponds to that selected at switch 100. Process and control unit 96 may also be coupled to a suitable automated test stand for accomplishing engine timing, and specifically distributor adjustment, without operator intervention and/or to an oscilloscope or other display or storage device. A digital display may also be used at 102 to provide a direct indication of ignition angle. It will be appreciated that all inputs to and outputs from process and control unit 96 are fed through suitable interface adapters not shown in FIG. 1 for purposes of clarity. In the above-mentioned working embodiment of the invention, central process and control unit 96 comprises a Rockwell International AIM 65 Advanced Interactive Microprocessor.

Figure 5:
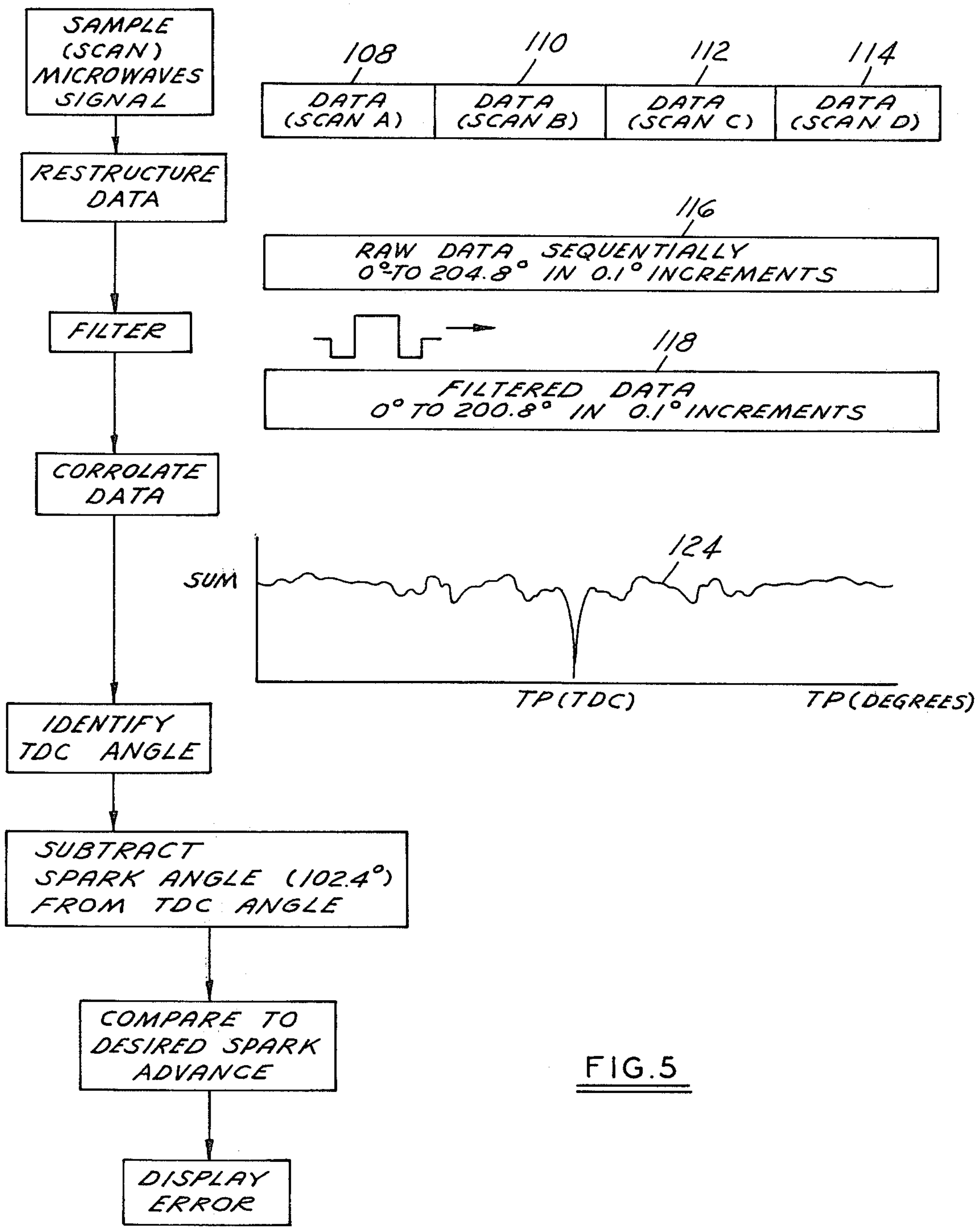
FIG. 5 is a flow chart describing operation of the invention.
Figure 6:
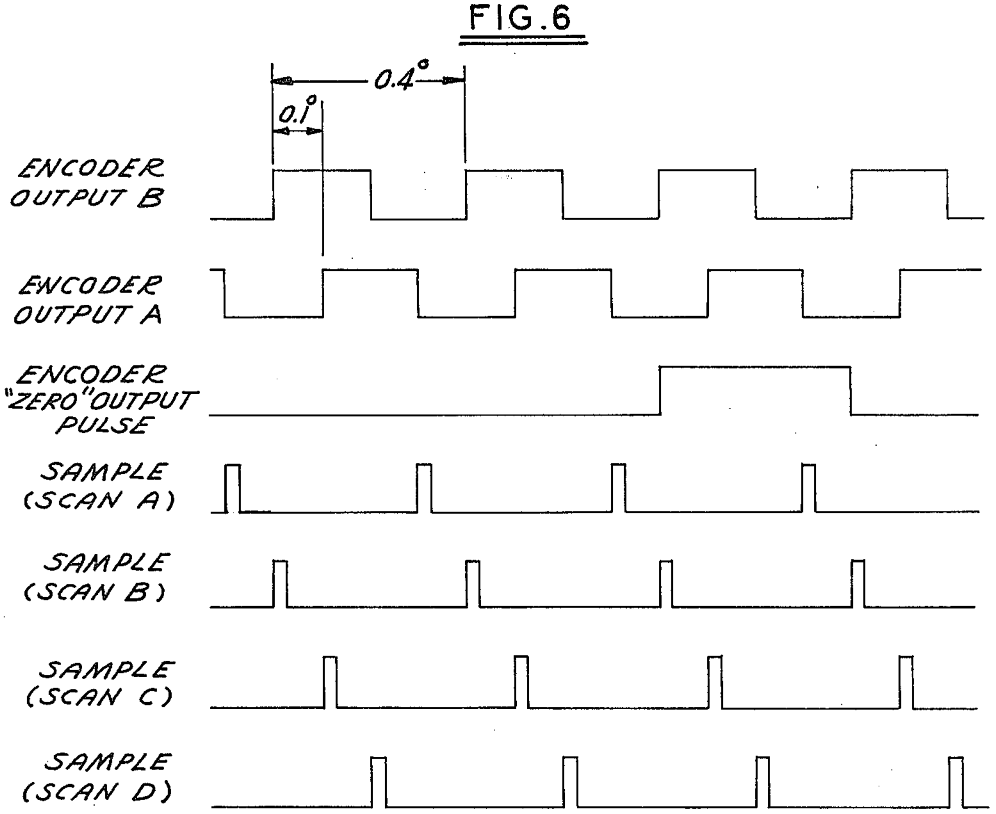
FIGS. 6 and 7 are further timing diagrams useful in understanding operation of the invention.

Operation of the invention will now be described in connection with FIGS. 4–7 of the drawings. The upper three waveforms in FIG. 6 illustrate the output of shaft encoder 20. Specifically, encoder 20 provides quadrature output square wave signals designated A and B, each having a period of 0.4° shaft rotation and separated in phase by an amount corresponding to 0.1° shaft rotation. Encoder 20 also provides a one pulse per revolution "zero" output pulse.

Figure 4:
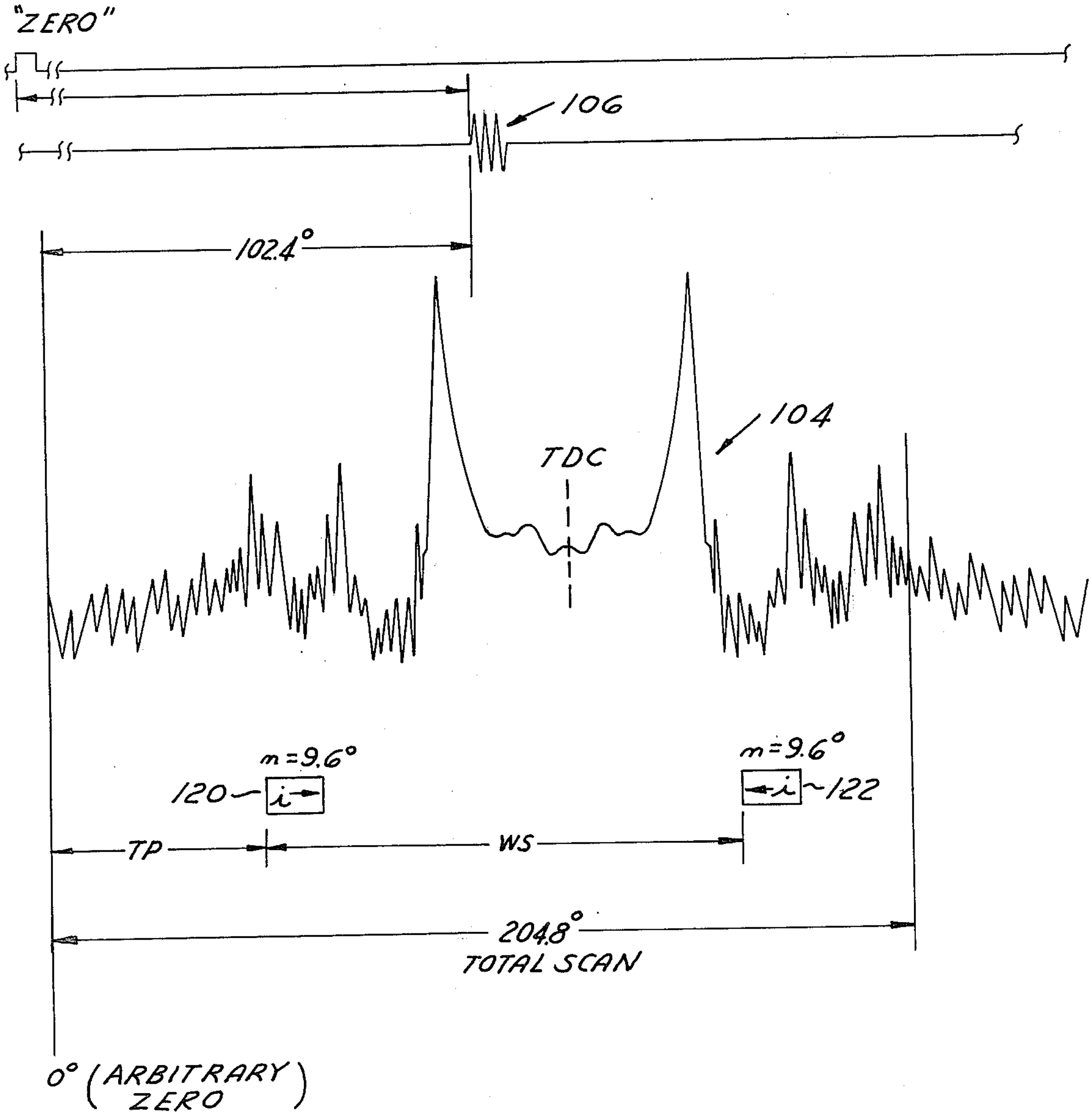
FIG. 4 is a timing diagram (not to scale) useful in understanding operation of the invention.

FIG. 4 illustrates the microwave signal 104 at transceiver 88 (FIG. 1) with reference to crankshaft angular position on either side, i.e. before and after, piston TDC position. The microwave signal is characterized by a plurality of resonances on either side of TDC, including a pair of relatively sharp resonances which bracket a relatively quiescent period as the piston approaches the TDC position. In theory, the microwave signal resonances on either side of the TDC are complementary, i.e. mirror images of each other as a function of crank angle. As will be described in detail hereinafter, advantage is taken of this phenomenon to identify the TDC angle by comparing angularly spaced portions of the microwave signal as appearing in two angularly spaced correlation windows and identifying the particular angle at which the microwave signals appearing in the respective windows are complementary. FIG. 4 also illustrates at 106 the ignition event or spark signal to plug 14 sensed by inductive pickup 98. In accordance with an important aspect of the invention, the angular position of occurrence of ignition event or spark signal 106 is then compared by process and control unit 96 to the "zero" signal from encoder 20, and an arbitrary zero position is established at a preselected angle preceding the ignition event. In the working embodiment of the invention, this angle is 102.4°. Thus, an arbitrary zero is established at a known angle or number of 0.1° angular intervals from the encoder "zero" pulse.

Microwave signal 104 (FIG. 4) is then sampled by process and control unit 96 (FIG. 1) through sample and hold circuit 92 and A/D convertor 94 on four successive engine cycles. Preferably, such data sampling is accomplished during four successive compression strokes so that the action of the exhaust valve will not affect the microwave resonance signals. In the working embodiment of the invention, the total scan angle is equal to 204.8° (FIG. 4) from the arbitrary zero position. Referring to FIGS. 5 and 6, the microwave signal is scanned in the successive engine cycles at interleaved angular intervals controlled by the encoder A and B outputs. More particularly, on the first engine cycle following establishment of the arbitrary zero position, scanning of the microwave signal through sample and hold circuit 92 and A/D convertor 94 (FIG. 1) is controlled by the trailing edge of the encoder A output (FIG. 6) so as to develop and store in processor and control unit 96 a first SCAN A data block 108 (FIG. 5) of digital signals indicative of sampled microwave signal amplitude at intervals of 0.4° shaft angle starting from the arbitrary zero position. On the next compression stroke, a second or SCAN B data block 110 representative of microwave signal amplitude at intervals of 0.4° starting at 0.1° from the arbitrary zero position is developed by triggering the sample and hold circuit at the leading edge of the encoder B output (FIG. 6). Similarly, SCAN C and SCAN D digital data blocks 112,114 (FIG. 5) are developed during successive engine cycles by triggering the sample and hold circuit at the leading edge of the encoder A output and the trailing edge of encoder B output respectively. Thus, upon termination of the data acquisition cycle, processor and control unit 96 has in memory four data blocks SCAN A through SCAN D (FIG. 5) totaling 2048 sampled and digitized data signals indicative of microwave signal amplitude at intervals of 0.1° crank angle. It will be noted that data acquisition is triggered by shaft angle, and is therefore essentially time independent.

The SCAN A through SCAN D data blocks 108–114 are then restructured within processor and control unit 96 so as to present a raw data block 116 consisting of a sequential series of digital signals corresponding to microwave signal amplitude at increments of 0.1° shaft rotation over a total range of 204.8° from the previously described arbitrary zero position. The raw data block 116 schematically illustrated in FIG. 5 thus comprises 2048 sequential samples of microwave signal amplitude. It should be noted that the use of four sequential data scans followed by a data restructuring operation is required in the working embodiment of the invention described herein because the particular process and control unit utilized is not capable of sampling data at 0.1° angular increments in a single data scan. No particular advantage is considered to lie in this data sampling technique, and a single sampling scan may be utilized where the previously described processor and control unit is replaced by a more powerful unit or supplemented by an input buffer or the like.

Figure 7:
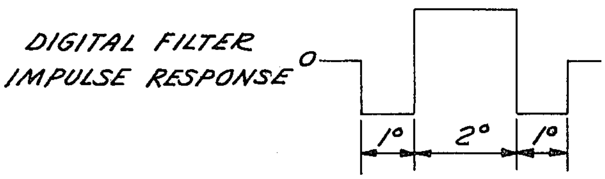

As a next step in the measurement of the TDC position, the sequential data block 116 is filtered to eliminate high frequency noise due to mismatch of the four sequential data scans, to eliminate any DC shift between the respective data scan signals and to eliminate high frequency components of the resonance signals. This is accomplished by implementing within processor and control unit 96 a generally conventional digital filtering technique. The impulse response for the digital filter utilized in the present invention is illustrated in FIG. 7. The filter impulse response should be symmetrical about an arbitrary center line and of equal area above and below "zero". The particular impulse response shown in FIG. 7 defines a function FILTER(y) as being equal to "minus 1" for y equal 0° and 1°, equal to "plus 1" for y between 1° and 3°, equal to "minus 1" for y between 3° and 4°, and zero for all other values of y. A block 118 of filtered data is obtained and stored within unit 96 by applying generally conventional digital filtering techniques in accordance with the following equation:

$$DATA(j) = \int_{j}^{j+40a} RDATA(y) \cdot FILTER(y)dy \qquad (1)$$

where a equals 0.1°, j increases in increments of a, DATA(j) is filtered data at the jth sample interval, RDATA(y) is raw data in block 116 at the yth angular interval, and FILTER(y) is the impulse filter response function previously described. Upon completion of the filtering operation, data block 118 will consist of 2008 sampled, digitized and filtered data signals indicative of microwave signal amplitude over 200.8° from the arbitrary zero position, the last 4° or 40 data bits being lost in the filtering operation. This will place a 2.0° offset in the ultimate TDC measurement.

In theory, the above integration (equation 1) is to be performed for each data point starting from 0.0° up to 200.8°, i.e. 2008 separate integrations. It will be noted, however, that the product of RDATA(y)·FILTER(y) will change for each successive integration only at the leading and trailing edges of the filter impulse response function. Thus, the complete integration need only be performed at j equal to 0.0 degrees, and each successive "integration" may thereafter be obtained arithmetically. For example, filtered data at the 0.1° position is given by the following equation:

$$DATA(0.1°) = DATA(0.0°) - RDATA(4.1°) + 2RDATA(3.1°) - 2RDATA(1.1°) + RDATA(0.1°) \qquad (2)$$

where RDATA(4.1°), RDATA(3.1°), RDATA(1.1°) and RDATA(0.1°) are the values of the data in block 116 at crank angles of 4.1°, 3.1°, 1.1° and 0.1° respectively.

The filtered data is then correlated in accordance with the invention to identify TDC position. This is accomplished within process and control unit 96 by establishing first and second correlation windows 120,122 (FIG. 4) each n sample intervals in length and separated from each other by a fixed number of sample intervals WS. The first window 120 is separated from the arbitrary zero position by a variable number of sample intervals TP. The data signals in the correlation windows 120,122 are then compared as TP varies. A particular number of intervals TP(TDC) for which the sets of data signals in windows 120,122 are substantially complementary is then identified. TDC may then be located with accuracy.

More particularly, the correlation step involves the development of a further data block SUM(TP) illustrated in analog form at 124 in FIG. 5 in accordance with the following equation:

$$SUM(TP) = \sum_{i=0}^{n} DATA(TP + i) - DATA(TP + WS + n - i) \qquad (3)$$

where i varies in increments of 0.1°, DATA(TP+i) is the value of the filtered data signal at angular interval number TP+i, where DATA(TP+WS+n−i) is the value of the filtered data at angular interval TP+WS+n−i, and where TP varies in increments of 0.1° from zero to a maximum of A−n−WS where A is the total number of sample intervals. (It is believed that experience will permit A to be smaller and/or permit TP to vary over a lesser range in actual practice). At a particular value of TP, TP(TDC) in FIG. 5, at which correlation windows 120,122 (FIG. 4) are evenly spaced on either side of the TDC position, the data sets as seen in such windows are substantially complements of each other, so that the subtraction performed in equation 3 approaches zero as illustrated by the sharp cusp in FIG. 5. Preferably, TP(TDC) is the angle of the lowest value of SUM(TP) which satisfies the criterion:

$$2SUM(TP_i) < SUM(TP_{i-2}) \qquad (4)$$

The crank angle TDC at the top dead center position, i.e. the number of data intervals from the arbitrary zero position, (ignoring the 2° offset previously mentioned) is then given by the equation:

$$TDC = TP(\min) + \frac{WS + n}{2}. \qquad (5)$$

In the working embodiment of the invention, A=2008, n=96, and WS=768.

Once the TDC angle has been identified as previously described, the relationship of the spark event 106 to the TDC angle is then obtained by subtracting the spark angle (102.4°) from the TDC angle. The result is then compared to the desired spark angle entered on switches 100 (FIG. 1), and any error displayed at 102 as previously described. The operator may then adjust distributor 12 so as to minimize or eliminate the displayed error signal. Application of the invention to conventional gasoline or spark-type engines has been described. In such application, a microwave frequency of ten gigahertz is preferred. Resolution accuracy is a function of the resolution of shaft encoder 20 and, in the embodiment described, is 0.1°.

Figure 8:
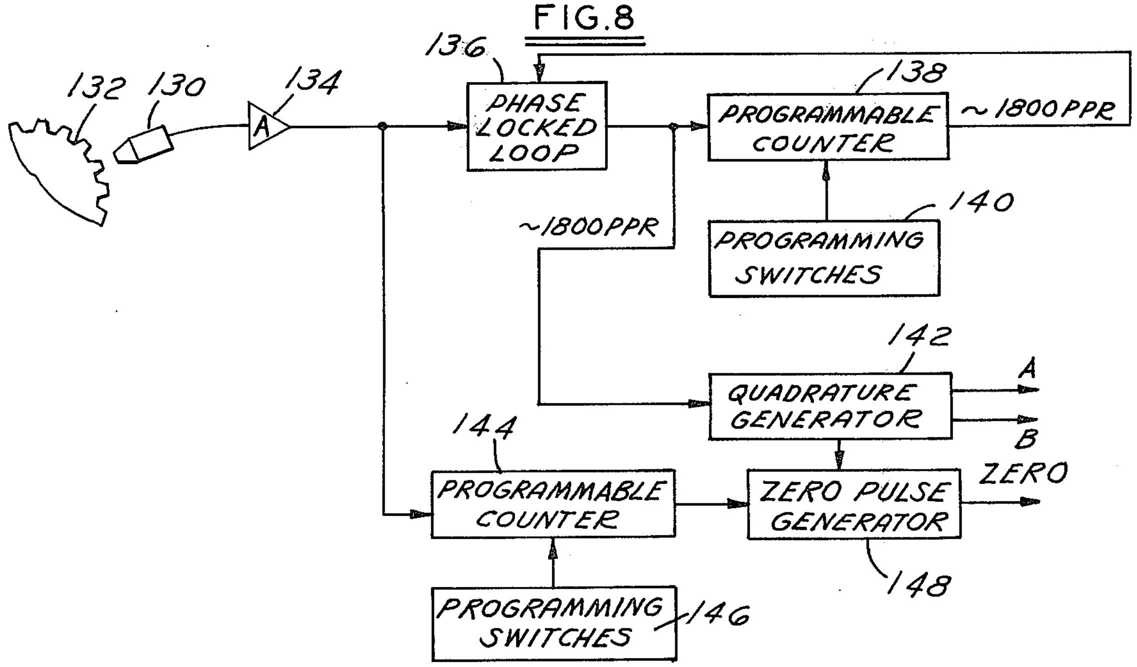
FIG. 8 is a functional block diagram of a modification to the basic embodiment of the invention illustrated in FIG. 1.

It is also contemplated that the invention may be used after the monitored engine has been installed into a vehicle or in other applications such as existing test stands where mounting of shaft encoder 20 to the engine would be inconvenient or impossible. FIG. 8 illustrates a modification to the basic embodiment of the invention for use in such applications. Referring to FIG. 8, a variable flux-responsive magnetic probe 130 is removably mounted adjacent the ring gear 132 (FIGS. 1 and 8) provided on conventional engines for this purpose of coupling the engine to a starting motor (not shown), or a gear permanently mounted on the test stand and accurately coupled to the drive shaft. Pickup 130 is coupled to electronic circuitry for providing the quadrature A and B outputs to replace the encoder outputs previously described, and also to provide the one pulse per revolution "zero" signal. More particularly, pickup 130 is connected through an amplifier 134 to a phase locked servo loop 136.

Loop 136 provides an output to a programmable counter 138 which receives a control input from operator variable programming switches 140. Preferably, the switches 140 are set so that the output of phase locked loop 136 to a quadrature generator 142 approaches as closely as possible 1800 pulses per revolution of the ring gear 132. Quadrature generator 142 generates the A and B encoder output signals previously described, which together effectively reduce each revolution of the ring gear 132 onto about 3600 separate angular intervals each about 0.1 degrees in length. Amplifier 134 is also connected to a second programmable counter 144 which receives a control input from a second set 146 of programming switches. A zero pulse generator 148 receives an input from counter 144 and a control input from generator 142, and provides at its output a "zero" output at a rate of one pulse per revolution of ring gear 132. Switches 140,146 may be manually or automatically controlled.

It will be appreciated from the foregoing description that the invention possesses a number of significant advantages over prior art microwave engine timing techniques. For example, the invention monitors and is responsive to amplitude of the microwave resonances, and therefore to piston position, with respect to shaft angle, and is essentially time independent. Therefore, although a motored engine speed above 650 to 850 RPM, and particularly above 1000 RPM, is preferred to eliminate problems associated with low speed engine vibrations, it is not necesary to maintain a constant engine speed.

Additionally, and although the invention has been disclosed in detail in connection with a gasoline engine, it will be apparent that the invention in its broadest aspects is equally useful in a diesel engine. In the usual diesel engine, the microwave probe may replace the glow plug in the upper portion of the cylinders and a microwave frequency on the order of ten gigahertz may be employed. For the so-called split chamber diesel engine, the probe will replace the glow plug in the swirl chamber and a higher microwave frequency on the order of thirteen to sixteen gigahertz may be employed so that the microwave emissions may propagate into the main chamber so as to be responsive to piston position. In either type of diesel engine, an instrumented fuel injection valve may be employed so that the crank angle at fuel injection may be related to piston TDC. Other events indicative of fuel ignition such as illuminance in the swirl chamber may also be utilized.

As previously noted, the invention may be employed in a specially built cold test stand at an engine assembly plant or, utilizing the modification of FIG. 8, in a preexisting test stand. The invention in its broadest aspects may also be utilized in a hot test stand or in a service environment with the engine mounted in an automobile. For a diesel engine, the glow plugs are unnecessary once the engine is warm, so replacement of a glow plug with a microwave probe would not affect engine operation. For a gasoline engine, the microwave signal may be injected into the cylinder through the spark plug utilizing the apparatus disclosed by the above-referenced Merlo patents or other suitable means for coupling the microwave signal to the spark plug body.

Utilizing the equipment hereinabove described, the invention identifies the TDC angle in less than seven seconds, which may be contrasted with a required time on the order of minutes in the prior art. The invention may thus be employed for rapid and accurate timing of engines in real time on a mass production basis.

A source-code listing of a software program for performing all functions of processor and control unit 96 in the working embodiment of the invention previously described is incorporated herein as Appendix I. In Appendix I, alphanumeric variables hereinabove described, to the extent represented, are identified as follows: n=WNSIZE, TP=TESTP (L and H), SUM(TP)=TOT (L and H).

The invention claimed is:

1. Apparatus for measuring ignition timing of an internal combustion engine having at least one cylinder with a piston disposed to reciprocate therein and a rotatable shaft driven by said piston, said apparatus comprising means adapted to be operatively coupled to said shaft for providing a first signal which varies as a function of angular position of said shaft, means responsive to an ignition event correlated with said one cylinder for providing a second signal, means responsive to said first and second signals for indicating a first angular position of said shaft upon occurrence of said ignition event, means for injecting radiant energy into said cylinder such that resonances are developed as a function of motion of said piston within said cylinder, means responsive to said resonances and to said first signal for identifying a second angular position of said shaft corresponding to a TDC position of said piston within said cylinder, and means for comparing said first and second angular positions independently of time of occurrence of said ignition event and said TDC position to determine ignition angle relative to said TDC position of said piston within said cylinder.

2. For use with an internal combustion engine of the type which includes at least one cylinder, a piston disposed to reciprocate within said cylinder and a rotatable output shaft coupled to said piston, a method of measuring angular position of said shaft at top dead center of said piston within said cylinder comprising the steps of:

(a) coupling a microwave signal into said cylinder such that said cylinder and piston operate as a tuneable resonant cavity as said piston reciprocates within said cylinder, (b) monitoring angular position of said shaft, (c) detecting an event correlated with ignition at said cylinder, (d) identifying a first angular position of said shaft corresponding to said ignition event, (e) sampling said microwave signal at preselected angular intervals over a total angular range of shaft rotation which includes said first angular position, (f) developing from said sampled microwave signals a series of discrete data signals which vary as a function of sampled microwave signal amplitude at successive angular intervals, (g) sequentially comparing first and second variable sets of said data signals, with said sets each comprising a first preselected number of consecutive data signals corresponding to consecutive sample intervals and with said sets being separated by a second preselected number of sample intervals, (h) identifying a particular angular position within said angular range for which data signals within said sets are substantially complementary, and (i) determining said angular position of said shaft at top dead center of said piston as a function of said particular angular position.

3. A method of measuring ignition timing of an internal combustion engine having at least one cylinder with a piston disposed to reciprocate therein and a rotatable shaft driven by said piston, said method comprising the steps of:

(a) monitoring angular position of said shaft, (b) identifying a TDC position of said piston within said cylinder by injecting microwave radiation into said cylinder, detecting resonances of said microwave radiation as said piston reciprocates within said cylinder and determining from said resonances said TDC position, (c) identifying a first angular position of said shaft corresponding to said TDC position of said piston, (d) monitoring for an event correlated with ignition at said cylinder, (e) identifying a second angular position of said shaft corresponding to said ignition event, and (f) comparing said second angular position to said first angular position to determine an apparent ignition angle relative to said apparent TDC position at said cylinder.

4. The method set forth in claim 3 comprising the additional steps of:

(g) comparing said apparent ignition angle with a preselected nominal ignition angle, and (h) adjusting timing of said ignition event relative to shaft position until said apparent ignition angle is equal to said preselected nominal ignition angle.

5. The method set forth in claim 4 for adjusting ignition timing in a gasoline engine of the type comprising a distributor and a plurality of spark plugs wherein said step (d) comprises the step of monitoring for a spark signal to a spark plug corresponding to said cylinder, and wherein said step (h) comprises the step of adjustably rotating said distributor.

6. The method set forth in claim 5 comprising the additional steps prior to said step (a) of:

(i) removing a spark plug from the corresponding spark plug opening of said cylinder while maintaining an electrical connection between said spark plug and said distributor, (j) assembling into said spark plug opening a microwave probe for injection of said microwave energy into said cylinder in said step (b), and (k) motoring said engine by coupling said shaft to external drive means.

7. The method set forth in claim 4 for measuring ignition timing in a diesel engine of the type comprising a fuel injection valve and a glow plug corresponding to each cylinder, said method comprising the additional steps prior to said step (a) of (i) removing a glow plug from the glow plug opening of said cylinder, and (j) assembling into said glow plug opening a microwave probe for injection of said microwave signals into said cylinder in said step (b).

8. The method set forth in claim 7 wherein said step (d) comprises the step of monitoring for an event correlated with injection of fuel into said cylinder.

9. The method set forth in claim 8 wherein a=0.1°, A=204.8°, N=2048, n=96 and WS=768.

10. The method set forth in claim 3 or 4 wherein said step of determining from said resonances said TDC position comprises the steps of:

(g) sampling said microwave signal at preselected angular intervals over a total angular range A of shaft rotation which includes said second angular position, each said interval having an angular length a, (h) developing from said sampled microwave signals N data signals each of which varies as a function of microwave signal amplitude, (i) sequentially comparing first and second variable sets of said N data signals, said sets each comprising n consecutive sample intervals and being separated by a fixed number of sample intervals WS as the number of sample intervals TP between one of said sets and an edge of said range A varies, (j) identifying a particular value TP(TDC) of TP for which sets of data signals within said sets are substantially complementary, and (k) determining TDC with reference to said edge of said range according to the function $$TDC = TP(TDC) + \frac{WS + n}{2}.$$

11. The method of claim 10 wherein said step (i) comprises the step of developing a data set SUM(TP) which varies with TP according to the function $$\mathrm{SUM}(TP) = \sum_{i=0}^{n} \mathrm{DATA}(TP + i) - \mathrm{DATA}(TP + WS + n - i)$$

where i varies in increments of a, where DATA(TP+i) is the value of said N data signals at a number of sample intervals equal to TP+i, and where DATA(TP+WS+n−i) is the value of said N data signals at a number of sample intervals equal to the sum of TP+WS+n−i.

12. The method set forth in claim 11 wherein said step (h) includes the step of converting sampled microwave signals into digital format, and wherein said method comprises the additional step between said step (h) and (i) of:

(l) filtering said N data signals according to the function $$DATA(j) = \int_{j}^{j+40a} RDATA(y) \cdot FILTER(y)dy$$

where j increases in increments of a, DATA(j) is filtered data at the jth sample interval, RDATA(y) is raw data in said digital format at the variable yth interval, and FILTER(y) is equal to "−1" for y between j and j+10a, equal to "+1" for y between j+10a and j+30a, and equal to "−1" for y between j+30a and j+40a.

13. The method set forth in claim 10 wherein said step (g) comprises the step of establishing said range A by subtracting from said second angular position of said shaft corresponding to said ignition event a preselected number of intervals less than said total number of intervals.

14. The method set forth in claim 13 wherein said preselected number of intervals is equal to N/2.

15. Apparatus for measuring ignition timing of an internal combustion engine having at least one cylinder with a piston disposed to reciprocate therein and a rotatable shaft driven by said piston, said apparatus comprising means rotatably coupled to said shaft for monitoring angular position of said shaft, means for identifying a TDC position of said piston within said cylinder including means for injecting microwave radiation into said cylinder, means for detecting resonances of said microwave radiation as said piston reciprocates within said cylinder and means for determining from said resonances said TDC position, means for identifying a first angular position of said shaft corresponding to said TDC position of said piston, means for monitoring for an event correlated with ignition at said cylinder, means for identifying a second angular position of said shaft corresponding to said ignition event, and means for comparing said second angular position to said first angular position to determine an apparent ignition angle relative to said apparent TDC position at said cylinder.

16. The apparatus set forth in claim 15 wherein said means for determining from said resonances said TDC position comprises means including analog-to-digital conversion means for sampling said microwave signal at N preselected angular intervals over a total angular range A of shaft rotation which includes said second angular position, each said interval having a length a, and digital processing means including means for developing from said N sampled microwave signals N data signals each of which varies as a function of microwave signal amplitude, means for sequentially comparing first and second variable sets of said N data signals, said sets each comprising n consecutive sample intervals and being separated by a number of sample intervals WS as the number of sample intervals TP varies between one of said sets and an edge of said range A, means for identifying a particular value TP(TDC) of TP for which sets of data signals within said sets are substantially complementary, and means for determining TDC with reference to said edge of said range according to the function $$TDC = TP(TDC) + \frac{WS + n}{2}.$$

17. The apparatus set forth in claim 16 wherein said means for sequentially comparing said first and second sets of data signals comprises means for developing a data set SUM(TP) which varies with TP according to the function $$SUM(TP) = \sum_{i=0}^{n} DATA(TP + i) - DATA(TP + WS + n - i)$$

where i varies in increments of a, where DATA(TP+i) is the value of said N data signals at a number of sample intervals equal to the sum TP+i, and where DATA(TP+WS+n−i) is the value of said N data signals at a number of sample intervals equal to the sum of TP+WS+n−i.

18. The apparatus set forth in claim 17 wherein said digital processing means further includes means for filtering said N data signals according to the function $$DATA(j) = \int_{j}^{j+40a} RDATA(y) \cdot FILTER(y)dy$$

where j increases in increments of a, DATA(j) is filtered data at the jth sample interval, RDATA(y) is raw data in said digital format at the variable yth interval, and FILTER(y) is equal to "−1" for y between j and j+10a, equal to "+1" for y between j+10a and j+30a, and equal to "−1" for y between j+30a and j+40a.

19. A probe for radiating microwave energy into the cylinder of an internal combustion engine comprising a hollow sleeve having a sleeve axis and a threaded end adapted to be received from externally of an engine into a threaded opening communicating with the cylinder bore, a coax connector mounted on an end of said sleeve remote from said threaded end coaxially with said sleeve axis and adapted to be releasably connected to a source of microwave energy through a transmission line and a mating coax connector, a section of coax cable telescopically mounted within said sleeve and including a central conductor coaxial with said axis, a shield coaxilly surrounding said central conductor and first insulation means separating said shield from said central conductor, said section of coax cable being connected to said connector so as to transmit microwave energy received at said connector through said sleeve, said shield terminating at said threaded end and said central conductor integrally extending from said threaded end so as to provide into a said cylinder bore when said threaded end is received into said threaded opening, and second insulation means sealingly enclosing the portion of said central conductor projecting from said threaded end.

* * * * *